(12) United States Patent
Matsumoto et al.

(10) Patent No.: US 7,104,153 B2
(45) Date of Patent: Sep. 12, 2006

(54) LINEAR ELEMENT LAYING STRUCTURE IN RELATIVE ROTATION MECHANISM

(75) Inventors: Kuniyasu Matsumoto, Yamanashi (JP); Hiroshi Nakagawa, Yamanashi (JP); Masahiro Morioka, Yamanashi (JP); Masaaki Uematsu, Kohu (JP)

(73) Assignee: Fanuc LTD, Yamanashi (JP)

( * ) Notice: Subject to any disclaimer, the term of this patent is extended or adjusted under 35 U.S.C. 154(b) by 538 days.

(21) Appl. No.: 10/406,287

(22) Filed: Apr. 4, 2003

(65) Prior Publication Data
US 2003/0200831 A1 Oct. 30, 2003

(30) Foreign Application Priority Data
Apr. 15, 2002 (JP) .............................. 2002-112371

(51) Int. Cl.
*B25J 17/00* (2006.01)
(52) U.S. Cl. .................................. 74/490.02; 74/490.01
(58) Field of Classification Search ............. 74/490.01, 74/490.02, 490.05, 490.06
See application file for complete search history.

(56) References Cited

U.S. PATENT DOCUMENTS 4,780,045 A 10/1988 Akeel et al.
5,437,207 A * 8/1995 Zimmer ................. 74/490.02
6,477,913 B1 * 11/2002 Akeel et al. ............ 74/490.03

FOREIGN PATENT DOCUMENTS

| JP | 60-177894 | 9/1985 |
| JP | 03-256691 | 11/1991 |
| WO | WO 01/39933 A1 | 6/2001 |

OTHER PUBLICATIONS

Communication including European Search Report dated Aug. 8, 2003.
Notice of Reasons for Rejection for corresponding application 2002-112371 dated Aug. 17, 2004.

* cited by examiner

*Primary Examiner*—David Fenstermacher
(74) *Attorney, Agent, or Firm*—Staas & Halsey LLP

(57) ABSTRACT

Pipes and/or wires extend in a bundle from a hollow portion of a second wrist element to a hollow portion of first wrist element of a robot. The first wrist element can rotate relatively to the second wrist element around an axis that passes through the two hollow portions. This bundle is divided into a plurality of split bundles in the hollow portion of the first wrist element. The split bundles are led out individually through a plurality of openings in the sidewall of the first wrist element and are connected to a working unit on a flange portion of the first wrist element.

3 Claims, 3 Drawing Sheets

LINEAR ELEMENT LAYING STRUCTURE IN RELATIVE ROTATION MECHANISM

BACKGROUND OF THE INVENTION

1. Field of the Invention

The present invention relates to a laying structure for linear elements, such as wires or pipes, located between two relatively rotating members, and more particularly, to a laying structure adapted to lay linear elements between relative rotation parts in a turning machine such as a robot or manipulator.

2. Description of the Related Art

A bundle of linear elements that are formed of wires and pipes, such as cables for supplying electricity and hoses through which a fluid such as air or water runs, is attached to and stretched between two members that can rotate relatively to each other. When the two members rotate relatively to each other, in this case, the bundle of linear elements is twisted, so that its durability lowers.

There are increasing demands for the enlargement of the range of operation of a robot and the improvement of the reliability of built-in cables of the robot, in particular. Accordingly, various proposals have been made to improve wiring and piping structures, such as cables, hoses, etc. in the relative rotation parts.

In the case of a robot wrist, in particular, a working unit such as a hand or welding gun is attached to the distal end of the wrist. Further, a plurality of linear elements, such as cables for supplying the working unit with electricity or hoses for running a fluid, such as air or water, are bundled and laid along an arm or wrist of the robot. Wrist elements of the robot wrist to which the working unit is attached frequently rotate and move relatively to a pedestal element, so that the durability of the linear elements is a critical problem.

There is a system to tackle this problem. According to this known system, the wrist elements are made hollow, and the central axis of the hollow is the center of relative rotation of the wrist elements. A bundle of linear elements, such as cables, is passed through the hollow structure. The bundle of linear elements is twined in the hollow structure as it is guided into the wrist elements so that the wrist element on the side of pedestal and the wrist element on the side of rotating part can rotate relative to each other within a given range.

As mentioned before, however, the hand, welding gun, or other working unit is attached to the rotating parts (wrist elements) on the distal end of the robot wrist, so that each rotating part may not be able to be formed in the shape of a pipe that has a through hole. In this case, the bundle of linear elements must be taken out through the side faces of the rotating parts.

FIG. 4 is a view illustrating relative rotation parts on the distal end of one such conventional robot wrist. A first wrist element 101 and a second wrist element 102 are formed having a hollow shape and a common central axis. The first wrist element 101 rotates relatively to the second wrist element 102 around the common central axis. The first wrist element 101 is formed having a flange portion on its distal end to which the hand, welding gun, or other working unit (not shown) can be attached. Thus, the distal end of the hollow first wrist element 101 is closed by the flange portion and is not pierced.

Accordingly, a bundle 10 of linear elements, which are formed of wires and pipes, such as cables for supplying electricity to the working unit on the flange portion of the first wrist element 101 and hoses through which air, water, or some other fluid runs, is led out through an opening 103 that is formed in the side face of the first wrist element 101.

The bundle 10 of linear elements passes through the respective hollow portions of the second and first wrist elements 102 and 101, bends in the shape of an L, and comes out through the opening 103 in the side face of the first wrist element 101. In the second wrist element 102, the bundle 10 is fixed by means of a fixing portion 104. In the first wrist element 101, the bundle 10 is fixed by means of a fixing portion 105 that is located near the opening 103.

When the first wrist element 101 rotates relatively to the second wrist element 102, therefore, the bundle 10 of linear elements also rotates together with the first wrist element 101, so that it is twisted in the direction of rotation of the element 101. If the first wrist element 101 repeatedly rotates in two opposite directions, it lowers the durability of the linear elements. If the number of linear elements that constitute each bundle 10 increases, the bundle 10 becomes so thick that it cannot be suddenly bent in the shape of an L with ease. Thus, the first wrist element 101 requires a wide space inside. If such a wide space is required in the robot wrist, however, the wrist must inevitably be large-sized, which is not structurally favorable.

Described in WO01/39933A1 is a method in which one bundle of linear elements is divided into a plurality of split bundles, and the split bundles are taken out in the direction of the radius of rotation of a first wrist element through an opening in its side face. According to this method, however, the split bundles inevitably gather and adhere to one another near the center of a hollow configuration that is located near the opening of the first wrist element. If the first wrist element rotates relatively to the second wrist element, therefore, a force to twist the bundles of linear elements is enhanced, and the split bundles strongly rub against one another, so that the durability of the bundles lowers.

OBJECT AND SUMMARY OF THE INVENTION

The object of the present invention is to provide a linear element laying structure in a relative rotation mechanism, in which a bundle of linear elements, formed of wires and pipes such as cables, hoses, etc., must be guided bent into the respective hollow portions of two relatively rotating members without penetrating the hollow portion of one of the two members, utilizing a narrow space required of a robot wrist or the like without narrowing the range of relative rotation with improved reliability.

In a linear element laying structure in a relative rotation mechanism according to the present invention, first and second members having a hollow portion each are connected to the mechanism so as to be relatively rotatable around an axis passing through the two hollow portions, and linear elements, formed of wires and/or pipes, are passed through a hole in the center of rotation of the junction of the first and second members and laid in the hollow portions. A bundle of the linear elements is fixed to a stationary portion on the hollow portion side of the second member, extends from the stationary portion and passes through the hollow portion of the second member, is guided into the hollow portion of the first member through the hole in the center of rotation, and is divided into a plurality of split bundles formed of one or more linear element each. The split bundles are guided at given angles to the direction of the radius of the relative rotation of the first member, drawn out through a plurality of openings in the side faces of the first member, and fixed near the openings.

Thus, the split bundles are arranged along the sidewall of the hollow portion near the openings, so that a space can be secured near the center. When the first and second members rotate relatively to each other, therefore, the split bundles can be prevented from unduly touching one another. Thus, the durability and reliability of the linear elements can be improved without requiring any wide space.

Further, the split bundles that are fixed near the openings may be designed so that their fixed portions are flat. Since the split bundles are laid flat, the linear elements of each split bundle are arranged circumferentially along the inner sidewall of the hollow portion near the openings, so that a space can be secured near the center. When the split bundles are twined as the first member rotates relatively to the second member, therefore, they can be prevented from unduly touching one another.

Furthermore, the present invention may be applied to a robot wrist with the second member used as a pedestal element of the axis of rotation of the distal end of the robot wrist and the first member used as a distal end element of the robot wrist.

DETAILED DESCRIPTION OF THE PREFERRED EMBODIMENT

Figure 1:
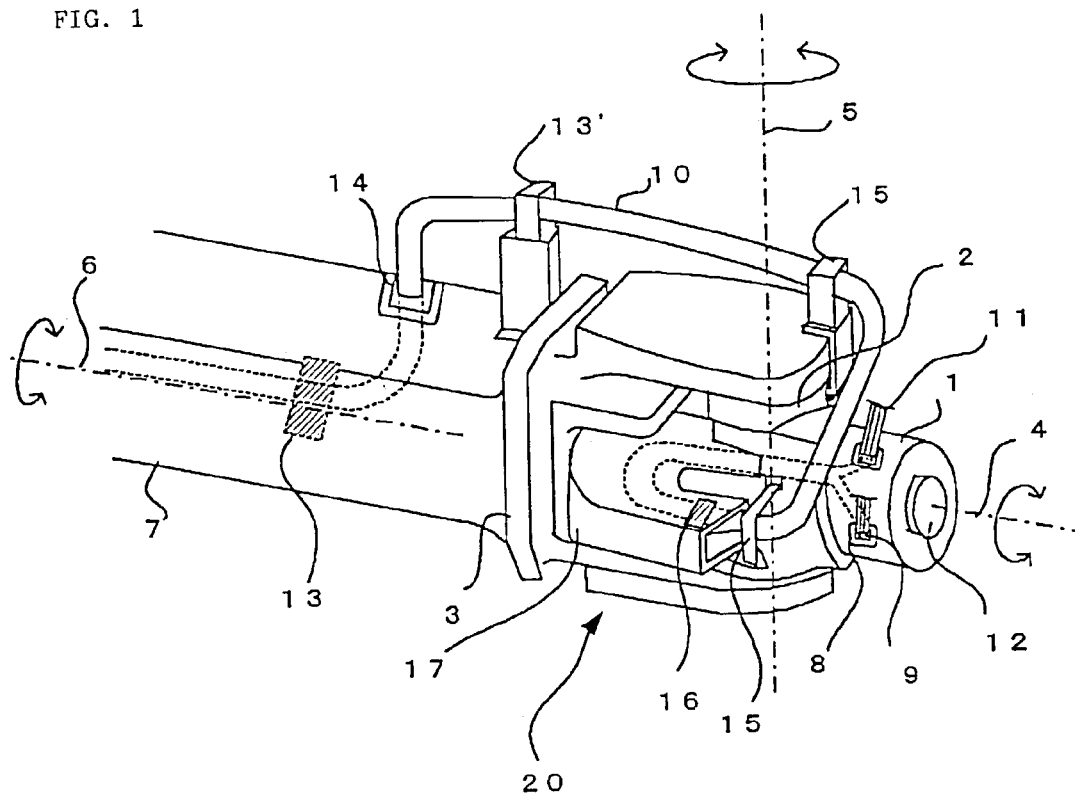
FIG. 1 is a schematic view of a robot wrist according to one embodiment to which the present invention is applied.

A robot arm 7 is rotatably mounted on an arm mounting portion (not shown). As shown in FIG. 1, a third wrist element 3 that forms a pedestal of a wrist 20 is fixed to the distal end of the robot arm 7. Since the robot arm 7 rotates around a third axis 6, the third wrist element 3 rotates around the third axis 6. Further, a second wrist element 2 is supported on the third wrist element 3 so as to be rotatable around a second axis 5 that crosses the third axis 6. Furthermore, a first wrist element 1 is supported on the second wrist element 2 so as to be rotatable around a first axis 4 that crosses the second axis 5.

Figure 2:
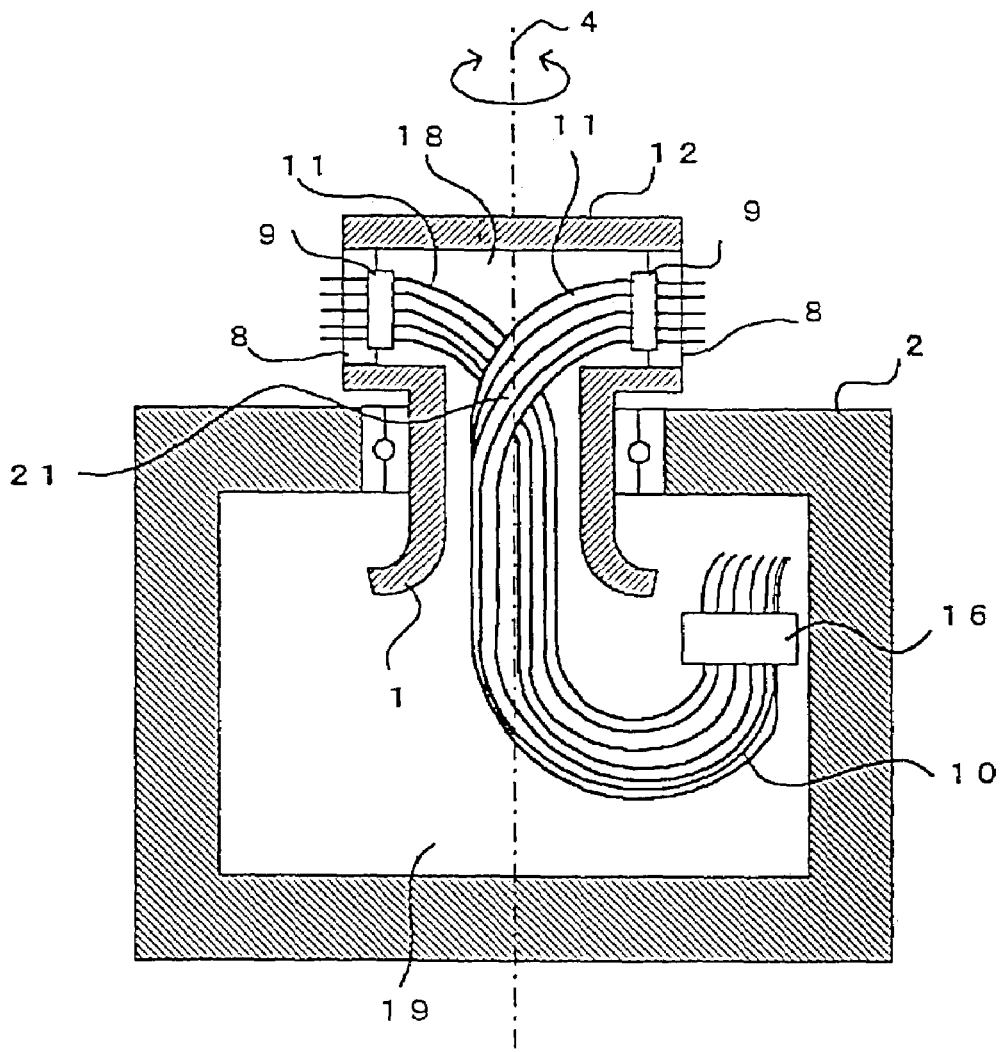
FIG. 2 is a view illustrating the way linear elements are laid between first and second wrist elements of the embodiment.

The first wrist element 1 is provided with a flange portion 12 on its distal end, on which a working unit such as a hand or welding gun is to be mounted. The peripheral surface of the first wrist element 1 is provided with a plurality of openings 8. The robot arm 7, first wrist element 1, and second wrist element 2 have a hollow form each. As shown in FIG. 2, the first axis 4 passes through the central portion of a hole that connects hollow portions 18 and 19 of the first and second wrist element 1 and 2.

A plurality of linear elements that are formed of wires or pipes for supplying the working unit, e.g., the hand or welding gun, on the flange portion 12 of the first wrist element 1 with electricity, air, or liquids are bound in a bundle. This bundle will hereinafter be referred to as a main bundle 10.

The main bundle 10 is fixed to the arm mounting portion (not shown) and is led but through an opening 14 in the robot arm 7. Further, it passes outside the third and second wrist elements 3 and 2, passes through a cover 17 on the second wrist element 2, and is guided into the hollow portion 19 of the second wrist element 2. Then, the main bundle 10 is guided into a hollow portion 18 of the first wrist element 1 through a hole in the center of rotation. Further, that part of the main bundle 10 which is located in the hollow portion 18 of the first wrist element 1 is divided into a plurality of bundles (split bundles) 11. The split bundles 11 (each of which is formed of one or more linear elements) are led out individually through the openings 8 and are connected to the working unit on the flange portion 12.

Numerals 13 and 13' individually denote clampers that clamp the main bundle 10 inside and outside the robot arm 7. Numerals 15 and 15' individually denote clampers that clamp the main bundle 10 on the second wrist element 2. Further, numeral 16 denotes a clamper in the cover 17 that covers the main bundle 10 on the second wrist element 2. Clampers 9 for fixing the split bundles 11 are also located individually near the openings 8 of the first wrist element 1. Besides the cover 17, a cover (not shown in FIG. 1) is located over that part of the main bundle 10 which is exposed to the outside.

As shown in FIG. 2, the first wrist element 1 is rotatably supported in the second wrist element 2. The hollow portion 18 of the first wrist element 1 communicates with the hollow portion 19 of the second wrist element 2. The central axis of the hole that connects the hollow portions 18 and 19 is substantially in line with the first axis 4 or the axis of rotation of the first wrist element 1 relative to the second wrist element 2.

The main bundle 10 is fixed in the hollow portion 19 (cover 17) of the second wrist element 2 by means of the clamper 16. As shown in FIG. 2, that part of the main bundle 10 which is located on the wrist-end side of its clamped portion is twined and turned substantially in the shape of a U or J, and is guided into the hollow portion 18 of the first wrist element 1 through a hole that extends along the first axis 4 at the junction of the first and second wrist elements 1 and 2. The main bundle 10 bent in this manner is divided into a plurality of bundles (split bundles 11) in the hollow portion 18 of the first wrist element 1. Each split bundle is formed of one or more linear elements, such as wires or pipes. In the example shown in FIGS. 2 and 3, the main bundle 10 is divided into three split bundles 11.

The split bundles 11 are guided individually into the openings 8 in the side faces of the first wrist element 1 and clamped by means of the clampers 9 near the openings 8. The bundles 11 are led out of the first wrist element 1 through the openings 8, individually, and are connected to a hand, welding gun, or other working unit on the flange portion 12 of the first wrist element 1.

Figure 3:
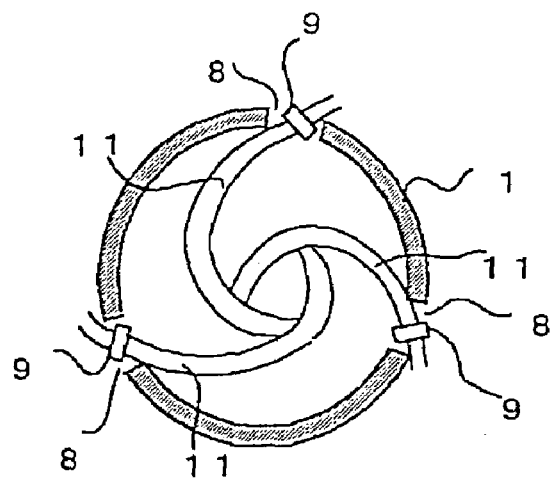
FIG. 3 is a view illustrating the way split bundles are led out through openings of the first wrist element.
Figure 4:
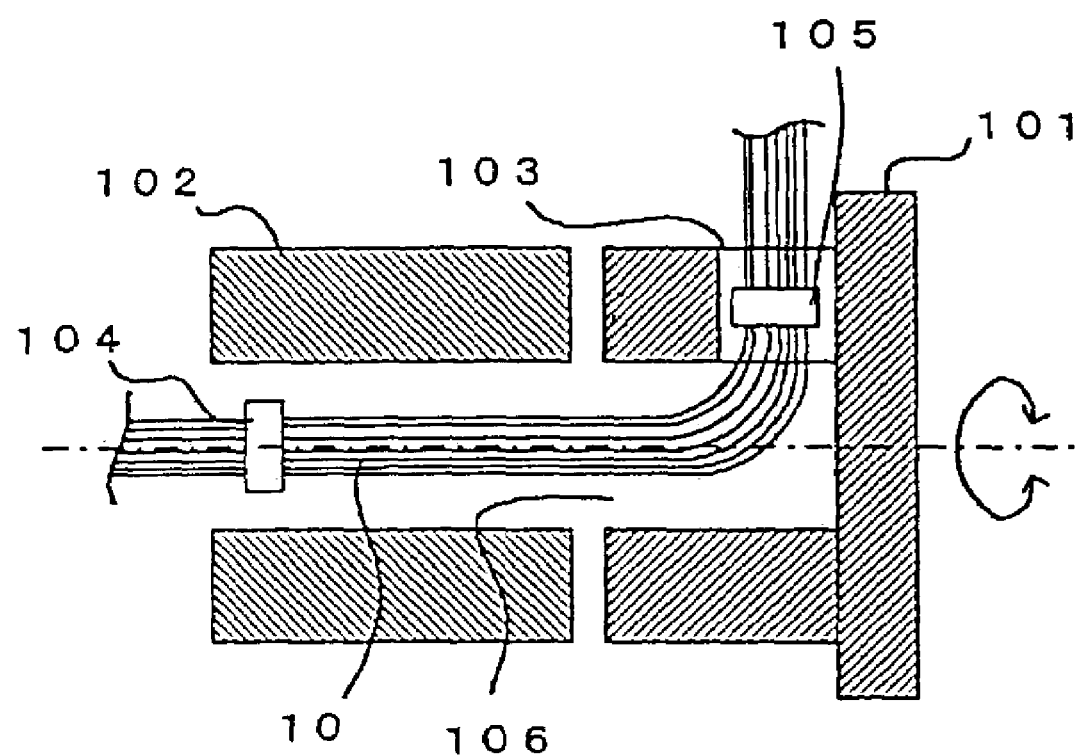
FIG. 4 is a view illustrating relative rotation parts of the distal end of a conventional robot wrist.

As shown in FIG. 3, the clampers 9 are provided on the first wrist element 1 at given angles to the radial direction from the first axis 4 or the central axis of rotation of the first wrist element 1. Preferably, these given angles have values such that the split bundles 11 are arranged along the sidewall of the hollow portion 18 of the first wrist element 1 so as to secure a space near the center of the hollow portion 18.

If the first wrist element 1 is rotated relatively to the second wrist element 2, a pedestal element of the axis of rotation, in one direction around the first axis 4, the main bundle 10 is subjected to a force to twist it, since its split bundles 11 are anchored to the second and first wrist elements 2 and 1 by means of the clampers 16 and 9. Since the space is secured near the center of the hollow portion 18 of the first wrist element 1, however, the split bundles 11 move close to the center of the hollow portion 18. Thus, the twisting force that acts on the main bundle 10 and the split bundles 11 weakens, and the split bundles 11 less frequently rub against one another.

If the rotation of the first wrist element 1 relative to the second wrist element 2 is repeated in this manner, the split bundles 11 of linear elements are twined into the main bundle 10 and only move close to the center of hollow portion 18, so that the hollow portion 18 of the first wrist element 1 need not be wide. Thus, the wrist (i.e., relative rotation mechanism) can be made compact. Further, the twisting force that acts on the main bundle 10 and the split bundles 11 weakens, and the split bundles 11 less frequently rub against one another, so that the durability of the linear elements can be improved.

In order to improve the durability of the linear elements, moreover, the range of influence of the twine and release of the split bundles 11 should be longer. To attain this, it is advisable to maximize the distance between the clampers 16 and 9.

Those parts of the split bundles 11 which are clamped by means of the clampers 9 near the openings 8 of the first wrist element 1 are made flat. With this configuration, the split bundles 11 are arranged circumferentially along the inner sidewall of the first wrist element 1 near the openings 8 of the hollow portion 18 of the first wrist element 1. Thus, a wider space can be secured near the center of the hollow portion 18. More specifically, the divided split bundles 11 of linear elements are arranged flat in one or more rows in the direction of the first axis and fixed to the first wrist element 1 by means of the clampers 9. Accordingly, the linear elements of the split bundles 11 are not twisted or tangled with one another in the sections between a branch point 21 where the main bundle 10 turns into the split bundles 11 and the clampers 9. If the first wrist element 1 is rotated, therefore, the main bundle 10 that bunches the split bundles 11 is twisted, so that the split bundles 11 move close to the center of the hollow portion 18 as they are wound around the main bundle 10. Thus, the twisting force on the main bundle 10 and the split bundles 11 is lessened as a whole, so that the durability of the linear elements can be improved. Since the wider space can be secured near the center of the hollow portion 18, moreover, contact between the split bundles 11 can be eased, and the durability of the linear elements can be prevented from being lowered by rubbing.

Further, the linear elements can be replaced by only removing the linear element bundles 10 and 11 from the clampers 13, 13', 15, 15', 16 and 9. Since those parts-which are bent in a narrow space such as the space in the wrist are formed of the split bundles 11, moreover, the linear element bundles 10 and 11 can be drawn out and attached with ease.

According to the embodiment described above, the present invention is applied to the wrist elements of the robot wrist that rotate relatively to one another. The present invention is also applied to the case where one member rotates relative to the other member, such as between a robot mounting base and a turning barrel, or in a machine or apparatus that has a turning mechanism. In this case, a plurality of bendable linear elements, such as hoses, pipes, etc., can be laid along the central axis of rotation in the same manner as in the case of a robot wrist. More specifically, a plurality of linear elements are twined into the main bundle, which is fixed to a member on the pedestal side of the relative rotation. On the other hand, the main bundle is divided into a plurality of split bundles that are formed of one or more linear element each. These split bundles are guided and fixed to a member that rotates relatively to the pedestal. They are arranged at given angles to the direction of the radius of the relative rotation.

According to the present invention, compared with the prior art, the angle of relative rotation can be enlarged without requiring a wide space, and the durability can be improved. Thus, the reliability of linear elements, such as cables, pipes, etc., can be enhanced.

What is claimed is:

1. A linear element laying structure in a relative rotation mechanism, in which first and second members having a hollow portion each are connected so as to be relatively rotatable around an axis passing through the two hollow portions, and linear elements, formed of wires and/or pipes, are passed through a hole in the center of rotation of the junction of said first and second members and laid in the hollow portions, wherein a bundle of said linear elements is fixed to a stationary portion of said second member on the side of the hollow portion, extends from the stationary portion and passes through the hollow portion of said second member, is guided into the hollow portion of said first member through the hole in the center of rotation, and is divided into a plurality of split bundles formed of one or more linear element each, and the split bundles are guided at given angles to the direction of the radius of the relative rotation of said first member, drawn out through a plurality of openings in the side faces of said first member, and fixed near said openings, wherein said split bundles are clamped by means of dampers located near the openings of the first member so that the clamped portions are flat.

2. The linear element laying structure in a relative rotation mechanism according to claim 1, wherein said second member is a pedestal element of the axis of rotation of the distal end of a robot wrist, and said first member is a distal end element of the robot wrist.

3. A robot arm, comprising:

first and second members having a hollow portion connected so as to be relatively rotatable around an axis passing through the two hollow portions;

a bundle of linear elements, formed of wires and/or pipes, passed through a hole in the center of rotation of the junction of the first and second members and laid in the hollow portions, wherein the bundle of linear elements is divided into a plurality of split bundles, and the split bundles are guided at given angles to a direction of the radius of the relative rotation of the first member, drawn out through a plurality of openings in a side face of the first member, and fixed near the openings by clampers.

* * * * *

UNITED STATES PATENT AND TRADEMARK OFFICE
CERTIFICATE OF CORRECTION

PATENT NO.        : 7,104,153 B1
APPLICATION NO.   : 10/406287
DATED             : September 12, 2006
INVENTOR(S)       : Kuniyasu Matsumoto et al.

It is certified that error appears in the above-identified patent and that said Letters Patent is hereby corrected as shown below:

Title Page, Item (75) (Inventors), Change "Kohu" to --Yamanashi--.

In the drawings:
FIG. 1, change "15" to --$15^1$--.

Column 3, Line 65, change "but" to --out--.

Column 5, Column 47, change "parts-which" to --parts which--.

Column 6, Line 36, change "dampers" to --clampers--.

Signed and Sealed this

Thirteenth Day of February, 2007

JON W. DUDAS
*Director of the United States Patent and Trademark Office*